May 23, 1961  J. BECKER  2,985,071
HIGH APERTURE OBJECTIVE OF THE GAUSS-TYPE
Filed April 4, 1960

INVENTOR.
JOHANNES BECKER

United States Patent Office 2,985,071
Patented May 23, 1961

2,985,071

HIGH APERTURE OBJECTIVE OF THE GAUSS-TYPE

Johannes Becker, Delft, Netherlands, assignor to N.V. Optische Industrie "De Oude Delft," Delft Netherlands Filed Apr. 4, 1960, Ser. No. 19,625

Claims priority, application Netherlands Apr. 9, 1959

1 Claim. (Cl. 88—57)

The invention relates to an objective of the Gauss-type which has a large relative aperture and is made up of five components comprising seven elements, viz. from the front towards the rear:

(a) A single convergent meniscus front lens which is convex towards the front;

(b) A single convergent meniscus second lens which is likewise convex towards the front;

(c) A divergent cemented doublet meniscus component which is convex towards the front and whose cemented surface is convex towards the rear;

(d) A cemented doublet meniscus component which is convex towards the rear and whose cemented surface is convex towards the front;

(e) A single bi-convex rear lens.

An objective of this type has been described in the United States patent specification 2,836,102.

I have found from calculations and measurements that a surprisingly well corrected objective of this type for photographic and projection purposes with a relative aperture up to F:1.3 and a field up to 45° can be obtained by selecting the radii of curvature ($r_1$–$r_{12}$) of the several lens surfaces, the axial distances ($d_1$–$d_{11}$) between such surfaces, the refractive indices ($n_d$) and the Abbe-numbers ($\nu$) of the several lens elements to substantially have the following numerical values:

[$f=100$, F:1.3]

| radius of curvature $r$ | axial distance $d$ | refractive index $n_d$ | Abbe number $\nu$ |
|---|---|---|---|
| $r_1 = +83.496$ | | | |
| $r_2 = +202.98$ | $d_1 = 8.75$ | 1.6780 | 55.5 |
| $r_3 = +70.207$ | $d_2 = 0.1$ | | |
| $r_4 = +132.34$ | $d_3 = 7.53$ | 1.6910 | 54.8 |
| $r_5 = +49.059$ | $d_4 = 0.6$ | | |
| $r_6 = -319.48$ | $d_5 = 18.98$ | 1.6393 | 44.9 |
| $r_7 = +26.951$ | $d_6 = 4.70$ | 1.72825 | 28.3 |
| $r_8 = -44.198$ | $d_7 = 20.19$ | | |
| $r_9 = +81.438$ | $d_8 = 2.35$ | 1.54072 | 47.2 |
| $r_{10} = -74.480$ | $d_9 = 12.74$ | 1.7170 | 47.9 |
| $r_{11} = +263.439$ | $d_{10} = 0.1$ | | |
| $r_{12} = -97.021$ | $d_{11} = 6.86$ | 1.7340 | 51.1 |

Figure 1:
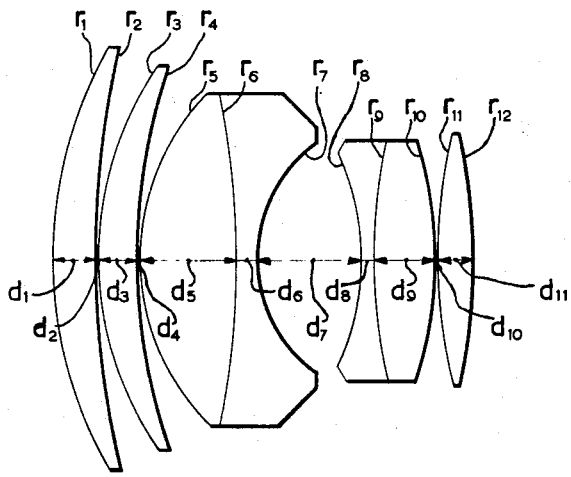
Figure 2:
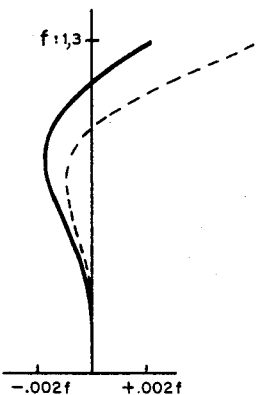
Figure 3:
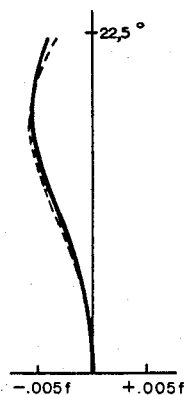
Figure 4:
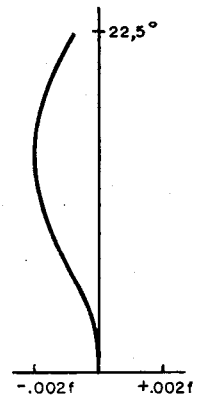

Fig. 1 of the drawing shows an objective in accordance to my invention;

Figs. 2, 3 and 4 are curves illustrating in the usual manner the spherical aberration and the unsatisfied amount of the sine-condition (Fig. 2); the astigmatism (Fig. 3 in which the line drawn in full represents the sagittal focal plane and the dotted line represents the tangential focal plane) and the distortion (Fig. 4). From the curves it may be easily recognized that the objective according to my present invention provides a substantial improvement over earlier types of similar design.

The spherical longitudinal abberration is lower than .002 $f$ for all zones. The maximum distortion is about .002 $f$ whereas the separation between the sagittal and the tangential foci is less than .001 $f$ for all incidence angles.

The chromatic difference in magnification between the c- and g-line (lateral color) amounts to .0023 $f$.

It will be understood by those skilled in the art that certain deviations from the exact values given hereinbefore for the radii of curvature, glass thickness, axial distances and grades of glass may be applied without the superb quality of my lens being destroyed. More particularly, it is possible to select a different value for the radius of curvature of a surface provided that the refractive index difference between the materials on both sides of the surface is so changed as to maintain the refractive power of the surface substantially constant.

What I claim is:

A high aperture objective of the Gauss-type which is made up of the following five components comprising seven elements, viz. from the front to the rear, a single convergent meniscus front lens which is convex towards the front, a single convergent meniscus second lens which is likewise convex towards the front, a divergent cemented doublet meniscus component which is convex towards the front and whose cemented surface is convex towards the rear, a cemented doublet meniscus component which is convex towards the rear and whose cemented surface is convex towards the front, a single bi-convex rear lens, the numeral data of said objective being substantially as follows:

($f=100$)

| radius of curvature $r$ | axial distance $d$ | refractive index $n_d$ | Abbe number $\nu$ |
|---|---|---|---|
| $r_1 = +83.496$ | | | |
| $r_2 = +202.98$ | $d_1 = 8.75$ | 1.6780 | 55.5 |
| $r_3 = +70.207$ | $d_2 = 0.1$ | | |
| $r_4 = +132.34$ | $d_3 = 7.53$ | 1.6910 | 54.8 |
| $r_5 = +49.059$ | $d_4 = 0.6$ | | |
| $r_6 = -319.48$ | $d_5 = 18.98$ | 1.6393 | 44.9 |
| $r_7 = +26.951$ | $d_6 = 4.70$ | 1.72825 | 28.3 |
| $r_8 = -44.198$ | $d_7 = 20.19$ | | |
| $r_9 = +81.438$ | $d_8 = 2.35$ | 1.54072 | 47.2 |
| $r_{10} = -74.480$ | $d_9 = 12.74$ | 1.7170 | 47.9 |
| $r_{11} = +263.439$ | $d_{10} = 0.1$ | | |
| $r_{12} = -97.021$ | $d_{11} = 6.86$ | 1.7340 | 51.1 | where $r_1$ to $r_{12}$ are the radii of curvature of the refractive lens surfaces, $d_1$ to $d_{11}$ are the axial distances between such surfaces, $n_d$ is the refractive index and $\nu$ is the Abbe number of the lens elements.

No references cited.

UNITED STATES PATENT OFFICE
CERTIFICATE OF CORRECTION

Patent No. 2,985,071                              May 23, 1961

Johannes Becker

It is hereby certified that error appears in the above numbered patent requiring correction and that the said Letters Patent should read as corrected below.

In the drawings, Fig. 4, for "-.002f" and "+.002f" read -- -.2% -- and --+.2% --, respectively; column 2, lines 10 and 11, for ".002f", second occurrence, read -- .2% --.

Signed and sealed this 27th day of March 1962.

(SEAL)
Attest:

ERNEST W. SWIDER                            DAVID L. LADD
Attesting Officer                                Commissioner of Patents